(12) United States Patent
Vreugdenhil et al.

(10) Patent No.: US 8,540,814 B2
(45) Date of Patent: Sep. 24, 2013

(54) COATINGS FOR CORROSION SUSCEPTIBLE SUBSTRATES

(75) Inventors: Andrew James Vreugdenhil, Peterborough (CA); Thomas Alan Singleton, Napanee (CA)

(73) Assignee: Trent University, Ontario (CA)

( * ) Notice: Subject to any disclaimer, the term of this patent is extended or adjusted under 35 U.S.C. 154(b) by 834 days.

(21) Appl. No.: 12/605,141

(22) Filed: Oct. 23, 2009

(65) Prior Publication Data
US 2010/0119837 A1    May 13, 2010

Related U.S. Application Data

(60) Provisional application No. 61/108,132, filed on Oct. 24, 2008.

(51) Int. Cl.
*C09D 183/06*    (2006.01)

(52) U.S. Cl.
USPC ............ 106/287.11; 428/447; 427/387

(58) Field of Classification Search
USPC .................................. 106/287.11
See application file for complete search history.

(56) References Cited

U.S. PATENT DOCUMENTS

| 4,800,122 A   * | 1/1989  | Sallavanti et al. ......... 428/412 |
| 6,541,562 B1  * | 4/2003  | Aoki et al. ................. 524/588 |
| 6,929,826 B1    | 8/2005  | Parkhill et al. |
| 2001/0053448 A1* | 12/2001 | Satsu et al. ................. 428/447 |
| 2006/0070551 A1* | 4/2006  | Kanamori et al. ....... 106/287.17 |
| 2006/0079616 A1* | 4/2006  | Kayanoki .................... 524/261 |
| 2008/0245260 A1 | 10/2008 | Campazzi et al. |
| 2009/0202815 A1 | 8/2009  | Campazzi et al. |

OTHER PUBLICATIONS

Definition "curing agents", from "about.com", Mar. 2013.*
F. Cataldo. On the Polymerization of P-Phenylenediamine. Eur Polym J, 32 (1996) 43-50.
A.J. Vreugdenhil, V.N. Balbyshev, M.S. Donley. Nanostructured Silicon Sol-Gel Surface Treatments for Al 2024-T3 Protection. J. Coatings Technol. 73 (2001) 35.
M.E. Woods, A.J. Vreugdenhil. Continuously Responsive Epoxy-amine Cross-linked Silion Sol-Gel Materials. J Mater Sci, 41 (2006) 7545-7554.
Vreugdenhil AJ, Gelling VJ, Woods ME, Schmelz JR, Enderson BP. the Role of Corsslinkers in Epoxy-amine Crosslinked Silicon Sol-Gel . . . Thin Solid Films, 517 (2008) 538-43.
X. Viatcheslav Freger and Sarit Bason. Characterization of ion Transport in think Films Using Electrochemical Impedence Spectroscopy. J. Membrane Science, 302 (2007) 1-9.
Williams, R. Interfacial Free Energies Between Polymers and Aqueous Electrolyte Solutions. J Phys Chem 79 (1975) 1274-1276.

* cited by examiner

*Primary Examiner* — Margaret Moore
(74) *Attorney, Agent, or Firm* — Barnes & Thornburg LLP

(57) ABSTRACT

Superior protective coatings for corrosion susceptible substrates are provided by lower alkoxysilane-epoxy polymeric compounds produced by sol-gel polymerization and cross-linked by reaction with an aromatic diamine cross-linking agent such as a phenylenediamine.

40 Claims, 10 Drawing Sheets

A: *p*-PDA; B: *m*-PDA; C: *o*-PDA

COATINGS FOR CORROSION SUSCEPTIBLE SUBSTRATES

RELATED APPLICATIONS

This application claims benefit under 37 U.S.C. §119(e) of U.S. Provisional Patent Application No. 61/108,132, filed Oct. 24, 2008, the disclosure of which is hereby incorporated by reference in its entirety.

BACKGROUND

This disclosure relates to coating compositions and methods for their application. More specifically, it relates to anti-corrosive coating compositions for application to metal substrates.

The most effective, known and long-popular anti-corrosive coatings for application to metal and metal alloy substrates are based on chromate conversion coatings (CCC) and strontium chromate pigmented primers. However, chromates have been found to be carcinogenic, and their use is being phased out, in some places by legislation. Consequently, relatively recent research has involved the exploration of novel corrosion inhibition agents. As a result, various alternative systems with lower toxicity have been investigated, with one such system being hybrid materials based on a modified silica sol-gel process.

The sol-gel process is a well-known, versatile, water based process for making ceramic and glass materials. In general terms, it involves the transition of a system from a liquid "sol" (mostly colloidal) phase into a solid "gel" phase. As applied to silica materials, an aqueous solution of an organosilane such as tetramethoxysilane is formed which, by means of hydrolysis and condensation reactions, forms a new phase, a sol, made up of solid particles of a diameter of a few hundred nanometers suspended in the aqueous liquid phase. Further condensation of the particles forms another new phase, a gel, in which solid macromolecules are immersed in the liquid. All reactions take place at or close to room temperatures, making it possible to incorporate a variety of additives into the gel. Substrates may be dipped into or sprayed with the gel.

In order to provide protective, anticorrosive coatings for metal substrates, however, such silica sol-gel coatings must be rendered impervious and hardened. This can be done by incorporating functional groups such as epoxy groups into the silica sol-gel composition, and then cross-linking (curing) the composition. Epoxy groups may be introduced into the macromolecular composition, for example, by using as a starting material in the silica sol-gel process an epoxy silane such as 3-glycidyloxypropyl trimethoxysilane (GPTMS), alone or in admixture with another organosilane. Curing may then be effected by reaction with a diamine, in the well known way of epoxy resin curing.

U.S. Pat. No. 6,929,826, entitled "Self-Assembled Nano-Phase Particle Surface Treatments for Corrosion Protection", issued Aug. 16, 2005 purports to describe a chromium-free composition and method for treating metallic surfaces. The composition comprises admixture of an alkoxysilane and an epoxyalkoxysilane and water. The composition is mixed and aged. An aliphatic amine and a surfactant are added to the composition after aging and metallic substrates may then be coated with the resulting solution.

The present disclosure seeks to overcome the aforementioned toxicity problems with anti-corrosive coatings for metal substrates while providing protective coatings of satisfactory, even enhanced protective quality, by replacing the standard chromate compositions with cured polysiloxanes, of significantly reduced toxicity.

SUMMARY

The present disclosure provides, from one aspect, silane hybrid inorganic-organic materials formulated using sol-gel techniques, and cross-linked or cured with special cross-linking reagents. Hydrophobic barriers to prevent water from reaching the metal substrate are formed, thereby slowing or preventing corrosion. The present disclosure uses chemical cross-linking reactions, utilising the well-known epoxy-amine reaction to create a crosslinked network of silica colloids, but utilizing various aromatic diamines which have been found to impart particularly advantageous properties to the resulting coatings. The materials used in the present disclosure are based on precursor lower alkoxysilanes such as tetraethoxysilane (TEOS) and tetramethoxysilane (TMOS), along with an alkyl-alkoxysilane with an epoxy group, such as 3-glycidoxypropyl trimethoxysilane (GPTMS). The polysiloxane macromolecules formed are cross-linked with an aromatic diamine.

Thus according to a first aspect of the present disclosure, there is provided a coating composition for application to a metal substrate for protection against corrosion, comprising at least one water dispersible lower alkoxysilane carrying an epoxide group, and a water dispersible aromatic diamine curing agent, the silane and the curing agent being capable of forming an aqueous dispersion for coating onto a corrosion-susceptible substrate and curing in situ on the substrate to form a corrosion resistant protective coating thereon.

A second aspect of the disclosure provides a corrosion susceptible substrate having thereon a corrosion resistant protective coating comprising at least one lower alkoxysilane polymer which has been cured by reaction of epoxy groups on the alkoxysilane with an aromatic diamine.

According to another aspect of the present disclosure, there is provided a process of preparing a corrosion resistant protective coating on a corrosion susceptible substrate, which comprises forming an aqueous suspension of a lower-alkoxysilane containing epoxy groups and an aromatic diamine, applying said aqueous suspension to the substrate, and polymerizing and curing the lower-alkoxysilane by sol-gel process to form a corrosion resistant protective coating on the substrate.

According to another aspect of the present disclosure, there is provided a process of preparing a corrosion resistant protective coating on a corrosion susceptible substrate, which comprises applying to the corrosion susceptible substrate an aqueous suspension of a polymerized or polymerizable lower alkoxysilane containing epoxy groups, forming a coating on the corrosion susceptible substrate of said lower alkoxysilane and curing the polymer coating on the corrosion susceptible substrate by reaction with an aromatic diamine curing agent.

BRIEF DESCRIPTION OF THE DRAWINGS

Several embodiments of the present disclosure will be provided, by way of examples only, with reference to the appended drawings, wherein:

FIG. 5b is a Infrared Spectra overlay of FIG. 5a;

DETAILED DESCRIPTION

Figure 1:
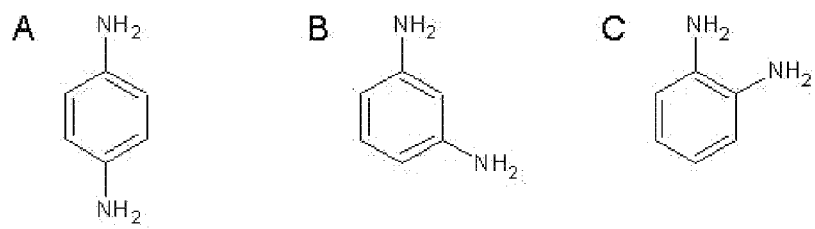
FIG. 1 is a schematic representation of exemplary aromatic diamine curing agents.

The preferred aromatic diamines for use as curing agents in the present disclosure are benzene diamines. More preferably the benzene diamine is a phenylenediamine such as, for example, p-phenylenediamine (p-PDA), m-phenylenediamine (m-PDA), and o-phenylenediamine (o-PDA) as shown in FIG. 1.

Unlike the aliphatic diamines, which have little steric hindrance or rigidity, phenylenediamines have a high degree of rigidity, owing to the aromatic core. This gives the resulting crosslinked materials markedly different properties both physically and chemically from those crosslinked with aliphatic amines. It has surprisingly been found that these coatings have interesting and beneficial corrosion inhibition properties when applied as barrier coatings on metallic substrates.

Figure 2:
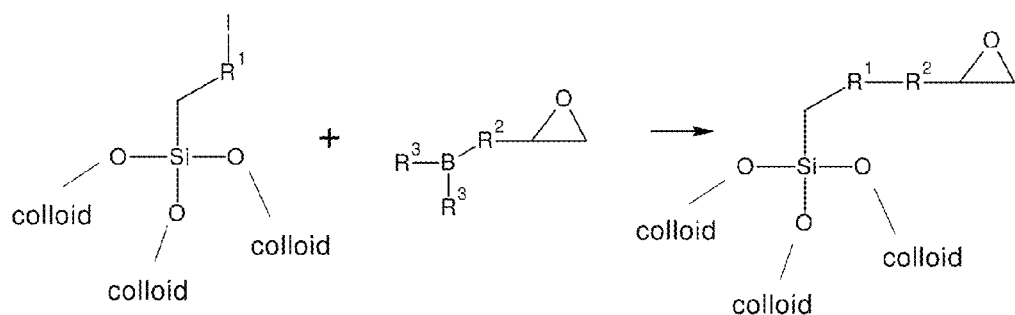
FIG. 2 is an exemplary schematic reaction diagram for the production of a epoxyalkoxysilane.
Figure 3:
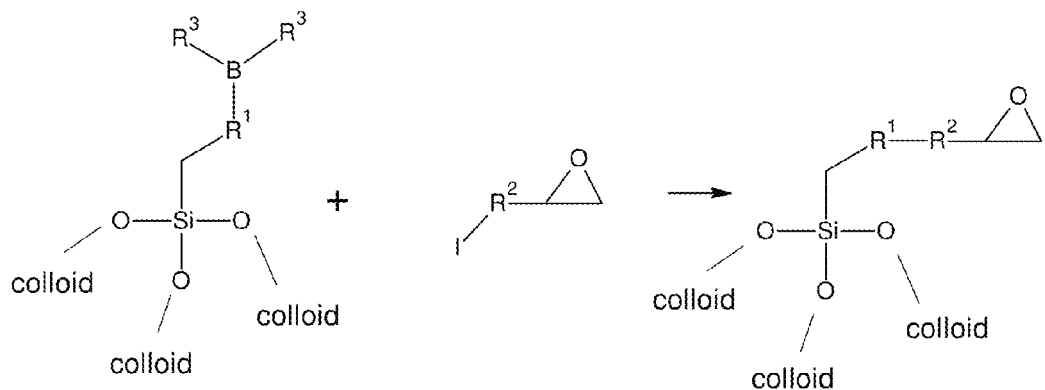
FIG. 3 is an exemplary schematic reaction diagram for the production of a epoxyalkoxysilane.

The lower alkoxysilanes preferred for use in the present disclosure are mixtures of a lower alkoxysilane carrying an epoxy group and a second alkoxysilane. In this way, the numbers of epoxy groups in the composition, in relation to the cross-linking reagent and the molecular weight of the resultant silane macromolecule can be controlled for optimum properties in given practical situation. This can be used, for example, to control cross-link density. There are, however, other ways in which epoxide groups can be introduced into silane macromolecules. One is to pre-form the silane macromolecule so that the macromolecule has residual reactivity to which the epoxide can be attached. The silane macromolecule can be treated with a short chain epoxide having appropriate reactive groups (such as halide) on the opposite end to the epoxide group, to bond to the silane macromolecule and provide the epoxy groups thereon, ready for cross-linking reaction with the aromatic diamine. One such method involves the use of a halopropyl silane such as iodopropyltrimethoxysilane as the silane monomer, forming a colloidal dispersion of the silane macromolecule so formed, and displacing the halogen groups with a boronylated epoxide as shown in FIG. 2. A further alternative, as shown schematically in FIG. 3, is the use of a boronylated silane monomer, and similar treatment of the silane macromolecule therefrom with a halogenated epoxide.

The term "lower alkoxy" as used herein refers to alkoxy groups, straight chain, branched chain or cyclic, having from 1-6 carbon atoms. For example, suitable examples of the second lower alkoxysilanes may include tetraethoxysilane (TEOS), tetramethoxysilane (TMOS), methyltrimethoxysilane, methyltriethoxysilane, phenyltrimethoxysilane, phenyltriethoxysilane, aminopropyltrimethoxysilane, aminopropyltriethoxysilane, methylaminopropyldimethoxysilane, methylaminopropyldiethoxysilane, dimethylaminopropylmethoxysilane and dimethylaminopropylethoxysilane. Preferred among alkoxysilanes for use in the present disclosure are tetraethoxysilane (TEOS) and tetramethoxysilane (TMOS)

Suitable epoxyalkoxysilanes for copolymerization with the lower alkoxy silanes, for example, may include 3-glycidoxypropyltrimethoxysilane (GPTMS), 3-glycidyloxypropyltriethoxysilane (GPTES), 3-glycidyloxypropyltrichlorosilane, diethoxy(3-(glycidyloxy)propyl)methylsilane, dichloro(3-(glycidyloxy)propyl)methylsilane, 6-glycidyloxyhexyltriethoxysilane, and 6-glycidyloxyhexyltrimethoxysilane. Preferred as the epoxy group containing silane is 3-glycidoxypropyltrimethoxysilane (GPTMS).

In some exemplary embodiments, the second lower alkoxy is tetraethoxysilane (TEOS), tetramethoxysilane (TMOS), methyltrimethoxysilane, methyltriethoxysilane, phenyltrimethoxysilane, phenyltriethoxysilane, aminopropyltrimethoxysilane, aminopropyltriethoxysilane, methylaminopropyldimethoxysilane, methylaminopropyldiethoxysilane, dimethylaminopropylmethoxysilane and/or dimethylaminopropylethoxysilane.

In some exemplary embodiments, the epoxyalkoxysilane is 3-glycidoxypropyltrimethoxysilane (GPTMS), 3-glycidyloxypropyltriethoxysilane (GPTES), 3-glycidyloxypropyltrichlorosilane, diethoxy(3-(glycidyloxy)propyl)methylsilane, dichloro(3-(glycidyloxy)propyl)methylsilane, 6-glycidyloxyhexyltriethoxysilane, and/or 6-glycidyloxyhexyltrimethoxysilane.

In some exemplary embodiments, the aromatic diamine is ortho-phenylenediamine (o-PDA), meta-phenylenediamine (m-PDA), and/or para-phenylenediamine (p-PDA).

In a preferred exemplary embodiment, (GPTMS) is copolymerized with TEOS and/or TMOS.

The metal substrates may be, for example, a corrosion susceptible substrate. By way of non-limiting examples, such a substrate may be steel, aluminum or alloys thereof, and ferrous metals or alloys thereof.

In carrying out the modified silica sol-gel process of the present disclosure, temperatures at or close to room temperatures may be used, with all reactions taking place in aqueous solution. High water to silane ratios, e.g. 10:1-25:1, preferably about 15:1, promotes rapid hydrolysis and relatively slow condensation, which tends to enhance production of the desired colloidal silanes. Additionally, in some exemplary embodiments, the substrate to be coated may be present in the reaction solutions as the sol-gel process and the subsequent cross-linking take place. The coated substrate is then simply extracted from the resultant reaction mixture, and the deposited coating is allowed to dry and harden. Alternatively, in some exemplary embodiments, the sol-gel process may be conducted in the absence of the substrate to form the polysilane copolymer. The substrate may then be dip-coated or spray-coated with the copolymer composition and the diamine curing agent or cross-linking agent added to the coating directly on the substrate, followed by hardening and air-drying. In other exemplary embodiments, for example, in a spray coating process, the copolymer composition (silicate) and the curing or cross-linking agent may be sprayed simultaneously from two different nozzles at a controlled rate and concentration to give a fixed volume ratio and thereby achieve the desired cross-link density.

The disclosure is further described, for illustrative purposes, in the following specific, non-limiting examples.

Materials and Reagents

Sol-gel precursors tetramethoxysilane (98%, Aldrich) and 3-glycidyloxypropyl trimethoxysilane (≥98%, Aldrich), and cross-linking agents p-phenylenediamine (≥97.0%, Fluka), m-phenylenediamine (≥98.0%, Aldrich), and o-phenylenediamine (≥98.0%, Aldrich) were used as received. All water used was 18.2 MΩ; the acidified water used in the preparation of the silane mixture was 0.05 M acetic acid diluted from glacial (≥99.7%, Fisher). Experiments were performed at ambient temperature under atmospheric conditions, except where noted.

Example 1

Sol-Gel Synthesis

Coatings were applied to either glass, silicon (p-type, University Wafer) or aluminum alloy 2024-T3, hereinafter referred to as: "Al2024-T3" (McMaster-Can) substrates. The substrates were prepared as follows below. The glass slides were cleaned by sonication in methanol, immersion in a potassium hydroxide-ethanol solution, sonication in 18.2 MΩ water and allowed to air-dry. Aluminum slides were immersed in acetone, rinsed with 18.2 MΩ water, immersed in a combination of nitric and glacial acetic acid (1:1 v/v), rinsed with 18.2 MΩ water and allowed to air-dry. Silicon substrates were immersed in acetone, followed by immersion in a solution of 18.2 MΩ water, ammonium hydroxide, and 30% hydrogen peroxide in a molar ratio of 5:1:1 at 80° C. Substrates were then rinsed with 18.2 MΩ water and allowed to air-dry.

All substrates were surface treated by immersion in a solution of GPTMS in 0.05 M acetic acid (1:150 v/v) for 20 minutes and allowed to air-dry.

For the syntheses of the crosslinked sol-gels materials, TMOS (0.02 mol) and GPTMS (0.06 mol) were combined to form a 3:1 molar ratio mixture of silane monomers. The silane mixture was then added drop wise to 22 mL of acidified 18.2 MΩ water (0.05 M acetic acid) with stifling to yield a solution of fifteen moles of water to one mole of silane monomer. This mixture was covered and aged with continuous stifling for 72 hours. Following aging, a surfactant solution (9.4 mL, FLUORAD®, FC 4432, 0.1% w/w) and phenylenediamine cross-linking agents (0.015 mol in 10 mL of methanol/water 1:1 v/v) were added to the silane mixture. Cleaned, surface treated substrates were dip-coated in the resulting mixture. Each substrate was immersed three times and allowed to dry in air.

Example 2

Coating Stress Testing pH-Immersion Testing

To assess the coating resistance to erosion in various pH conditions, solutions comprised of 0.1 M pH-buffer and 1 M sodium chloride were prepared at pH values of 3, 5, 7, 9, and 11. Surface treated, coated, and taped substrates were immersed, and observed visually over a period of about two months. All substrates tested were taped at the edges to simulate a continuous surface with no edge effects. Edge effects arise since the coatings are thinnest at the edges of the substrate; thus erosion appears accelerated, and delamination is possible as the solution erodes the coating inward from the edge of the substrate. Taping ensures that a coating of uniform thickness is the only surface accessible to the solution.

Coated substrates were observed periodically for over the two month period. In acidic to slightly basic conditions, most coatings exhibited very good adhesion to the substrates. p-PDA persisted in pH 3 for two months before delamination. p-PDA crosslinked coatings immersed in pH 5, 7, and 9 show no major signs of degradation over any time frame. At pH 11, significant coating delamination occurred after one week. However, it should be noted that at these extreme pH alkaline conditions, solid portions of the coating itself persisted in solution which indicates an adhesive rather than a cohesive failure which may in fact have been due to the etching of the glass substrate rather than the material itself. p-PDA crosslinked coatings immersed in acidic conditions showed dramatic colour changes; initially a transparent brown and changing over time towards a deep blue-green. This colour change is irreversible. Some pinhole erosion was also observed primarily in strongly acidic conditions.

Both o-PDA and m-PDA demonstrated desirable erosion impeding properties, lasting nearly two months in pH 11 solutions without any significant delamination. After two months at pH 3, o-PDA demonstrated excellent adhesion and cohesion: very slight colouration and some pinhole erosion were noted. m-PDA demonstrated somewhat more pronounced colouration and some delamination and pinhole erosion. As with p-PDA, the more moderate pH conditions had little effect on the coatings, however more extensive irreversible colouration was also noted in acidic conditions.

The high degree of colouration observed in the gels, especially in gels crosslinked with p-phenylenediamine, suggests a secondary reaction is taking place within the gels, as they are exposed to extreme pH conditions. This is due to oxidation of unreacted cross-linking agent by dissolved oxygen, catalyzed by extreme pH conditions. This is a well-known phenomenon in systems with free phenylenediamine forming both monomeric nitro-aniline and highly-coloured oligomers and polymers of PDA (F. Cataldo, *Eur Polym J*, 32 (1996) 43-50).

Dilute Harrison's Immersion

Figure 4A:
FIG. 4a is a picture of an aluminum alloy slide coated with a mixture of an alkoxysilane and epoxyalkoxysilane and crosslinked with p-PDA prior to exposure to Harrison's Solution.
Figure 4B:
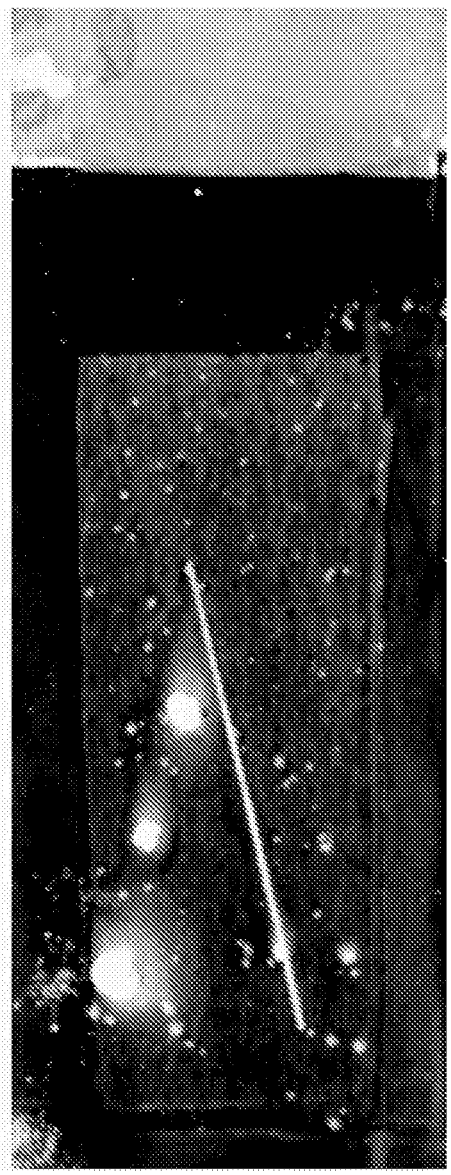
FIG. 4b is a picture of the aluminum alloy slide of FIG. 4a following 8-months exposure to Harrison's Solution.
Figure 4C:
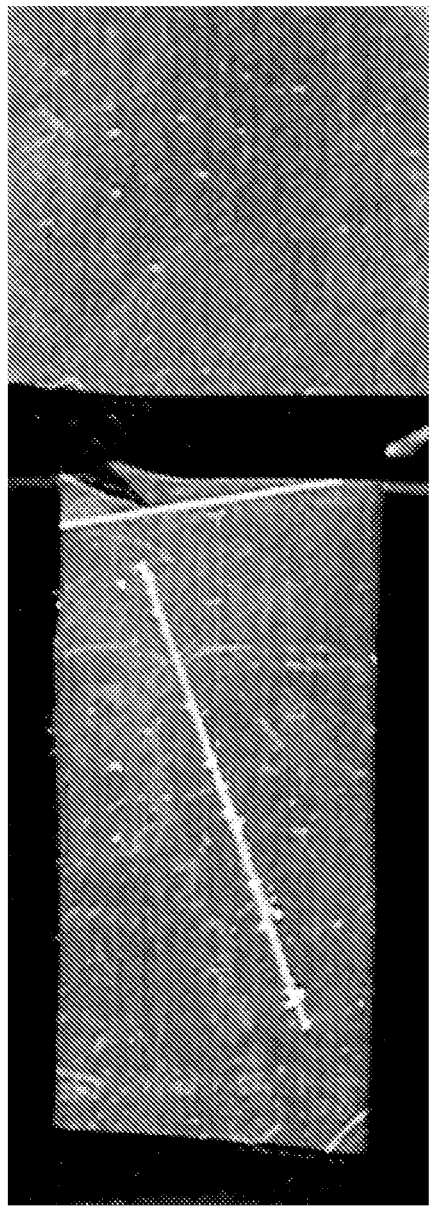
FIG. 4c is a picture of an aluminum alloy slide coated with a mixture of an alkoxysilane and epoxyalkoxysilane prior to exposure to Harrison's Solution.

To assess the corrosion inhibition abilities of the coatings, surface treated aluminum alloy substrates were immersed in dilute Harrison's solution (3.5 g ammonium sulphate (Fisher) and 0.5 g sodium chloride (Caledon) in 1 L water). Dilute Harrison's solution is an effective emulator of the effects of acid rain, and as such is a good test of resistance to environmental exposure. Surface treated aluminum alloy substrates were coated with gels crosslinked with each of the three phenylenediamine (PDA) isomers, as well as a fourth set with no cross-linking agent (a green gel). For example, FIG. 4a shows an exemplary aluminum slide coated with a mixture of an alkoxysilane and an epoxyalkoxysilane and cross-lined with p-PDA prior to exposure to Harrison's Solution and FIG. 4c shows a similar slide without cross-linking by a phenylenediamine. The slides of FIGS. 4a to 4d have intentional mechanical damage. The intentional damage was scribed by scratching the coating to produce a scribe line which can be seen in the figures as a diagonal line in the middle of the slides. In experimental conditions, four taped substrates were coated for each type of gel: three were scribed down to bare metal over a 2.5 cm length to evaluate the coating performance at a site of intentional mechanical damage. The fourth was used as a control to test overall corrosion protection. The samples were inspected visually: good corrosion inhibition was judged by a lack of aluminum oxide ("white rust"), as well as blistering, delamination, or spotting of the coating.

Figure 4D:
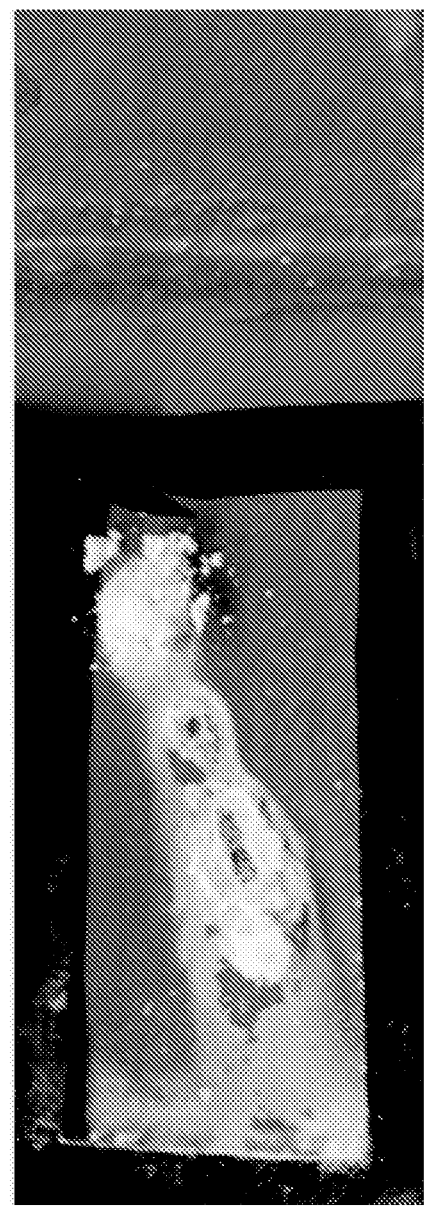
FIG. 4d is a picture of the aluminum alloy slide of FIG. 4c following 8-months exposure to Harrison's solution.

Point corrosion protection and scribe protection tests are well-known tests in the art for evaluating corrosion protection. Respectively, the tests are designed to emulate chips, scratches and the like to protective coatings on corrosion susceptible substrates for corrosion resistance evaluation. After twenty-two weeks of immersion, gels crosslinked with p- and o-PDA exhibit the best point corrosion protection and scribe protection, respectively. This performance is at least as good when compared with performance observed in the best aliphatic cross-linking agent, ethylenediamine, which was observed for 12 months (not shown). o-PDA crosslinked gels have the most significant point-corrosion; tiny flaws in the coating were observed to be attacked, however little oxidized aluminum was present in these areas. Gels crosslinked with o-PDA do seem to protect the scribe quite well; very little oxidized aluminum or other signs of corrosion were present in the scribe after 8 months. p-PDA crosslinked gels exhibit good scribe protection, and the least point-corrosion spots. For example, FIG. 4b shows the slide of FIG. 4a after eight months of exposure to dilute Harrison's solution. FIG. 4d shows the slide of FIG. 4c after eight months exposure to Harrison's solution. The decreased inhibition of corrosion protection can be noted in FIG. 4d, where a phenylenediamine curing agent was not used. m-PDA crosslinked gels exhibit reasonable point protection, whereas o-PDA and p-PDA provide more effective protection of exposed metal sections.

Overall, p-PDA crosslinked gels show the best corrosion resistance in dilute Harrison's immersion. Gels crosslinked with o-PDA exhibit good corrosion resistance, as well as the best scribe protection, which provides further evidence towards unique chemical protection of the substrate provided by the oxidative polymerization chemistry of the PDA cross-linkers.

Example 3

Characterization

Infrared Spectroscopy

In order to establish that the PDA cross-linkers are indeed effective at cross-linking the sol-gel matrix and do not provoke other unexpected morphological changes in the silica network, infrared and Raman spectra were acquired of the PDA crosslinked materials deposited on metal and glass substrates. Infrared spectroscopy of the crosslinked gels, as shown, for example in FIGS. 5a and 5b display peaks consistent with the formation of silica backbone and epoxy-amine cross-linking (A. J. Vreugdenhil, V. N. Balbyshev, M. S. Donley, *J. Coatings Technol.* 73 (2001) 35; M. E. Woods, A. J. Vreugdenhil. *J Mater Sci*, 41 (2006) 7545-7554). In particular Si—O—Si stretches centred around 1000 cm$^{-1}$ are visible, indicating the formation of the silane network. The reaction of the phenylenediamine cross-linking agent with the epoxide-decorated silica colloids can also be observed and shown in FIGS. 5 and 5b. The NH$_2$ scissoring mode, which appears as a somewhat broad feature just above 600 cm$^{-1}$ in the pure cross-linking agent (not shown), almost entirely disappears in the spectrum of the crosslinked gel (FIG. 5a).

Figure 5A:
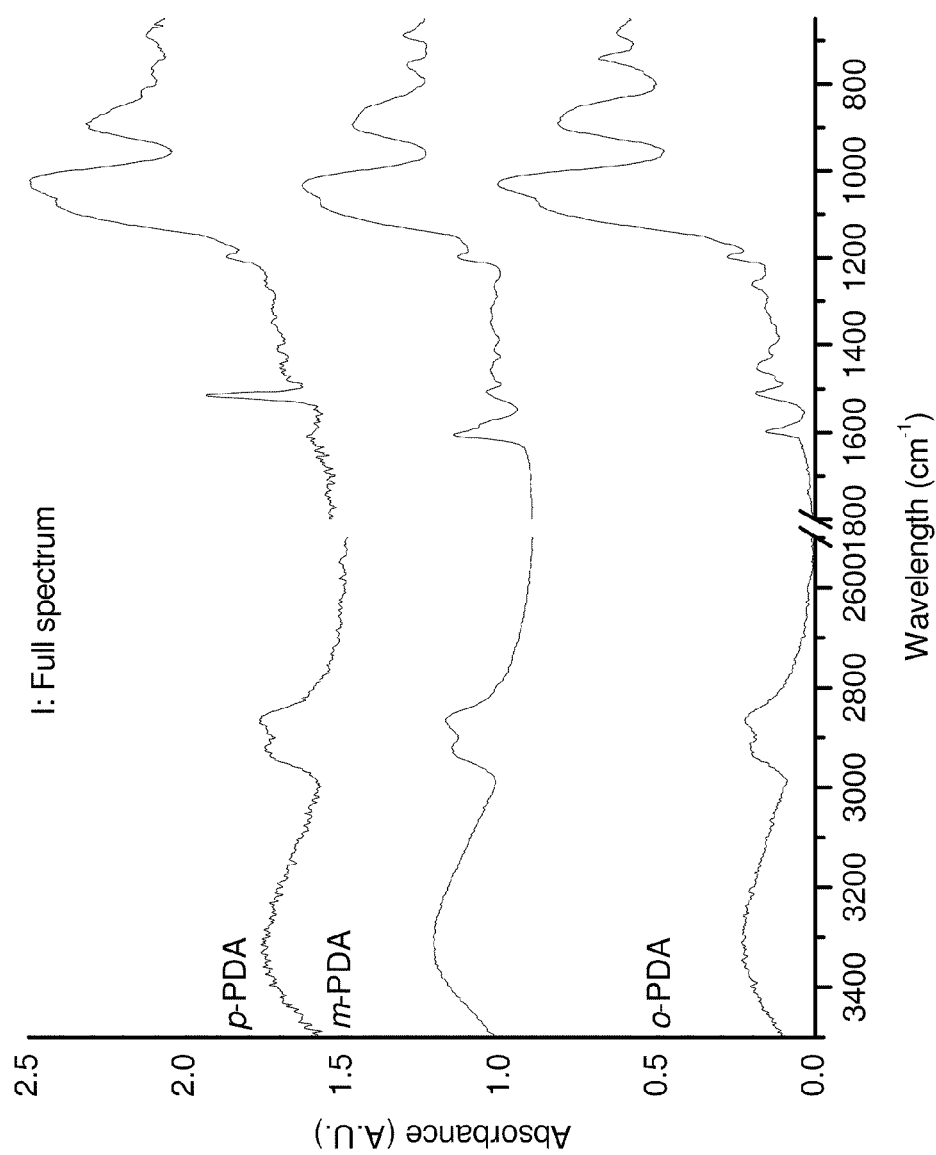
FIG. 5a is a Infrared Spectra of three gels crosslinked with isomers of phenylenediamine.
Figure 5B:
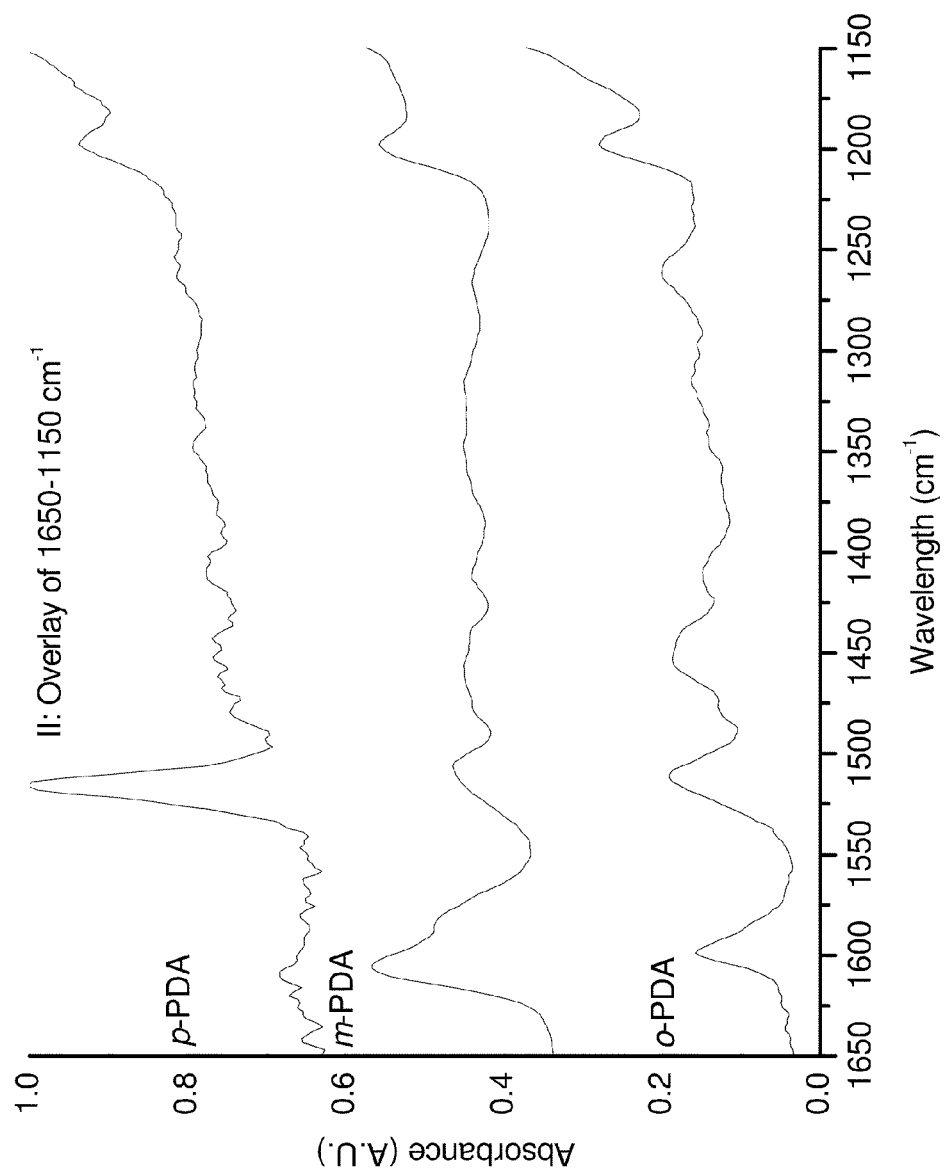

Evidence of the epoxide ring opening cross-linking reaction can be found in the absence of the peaks associated with the epoxide ring as shown in FIGS. 5a and b. For the GPTMS precursor the epoxide ring peaks appear at 3045 cm$^{-1}$ (epoxide CH$_2$ antisymmetric stretch), 1412 cm$^{-1}$ (epoxide CH$_2$ twist), and 913 cm$^{-1}$ (epoxide antisymmetric ring deformation). The most useful band is the CH$_2$ antisymmetric stretch at 3045 cm$^{-1}$, since it absorbs quite strongly and is unobscured by other peaks in the spectra. No traces of this feature remain after the gels have been exposed to the PDA cross-linkers and have solidified (FIGS. 5a and 5b), indicating high levels of epoxide consumption although some spontaneous epoxide ring opening may occur to form uncross-linked diols. Further evidence that the epoxy-amine cross-linking has occurred is given by the conversion of the primary amines of PDA to more extensively substituted amines. The characteristic strong scissoring mode of a primary aromatic amine found at 1638-1602 cm$^{-1}$ is either missing or of very low intensity in the crosslinked gels.

Electrical Impedance Spectroscopy (EIS)

Figure 6:
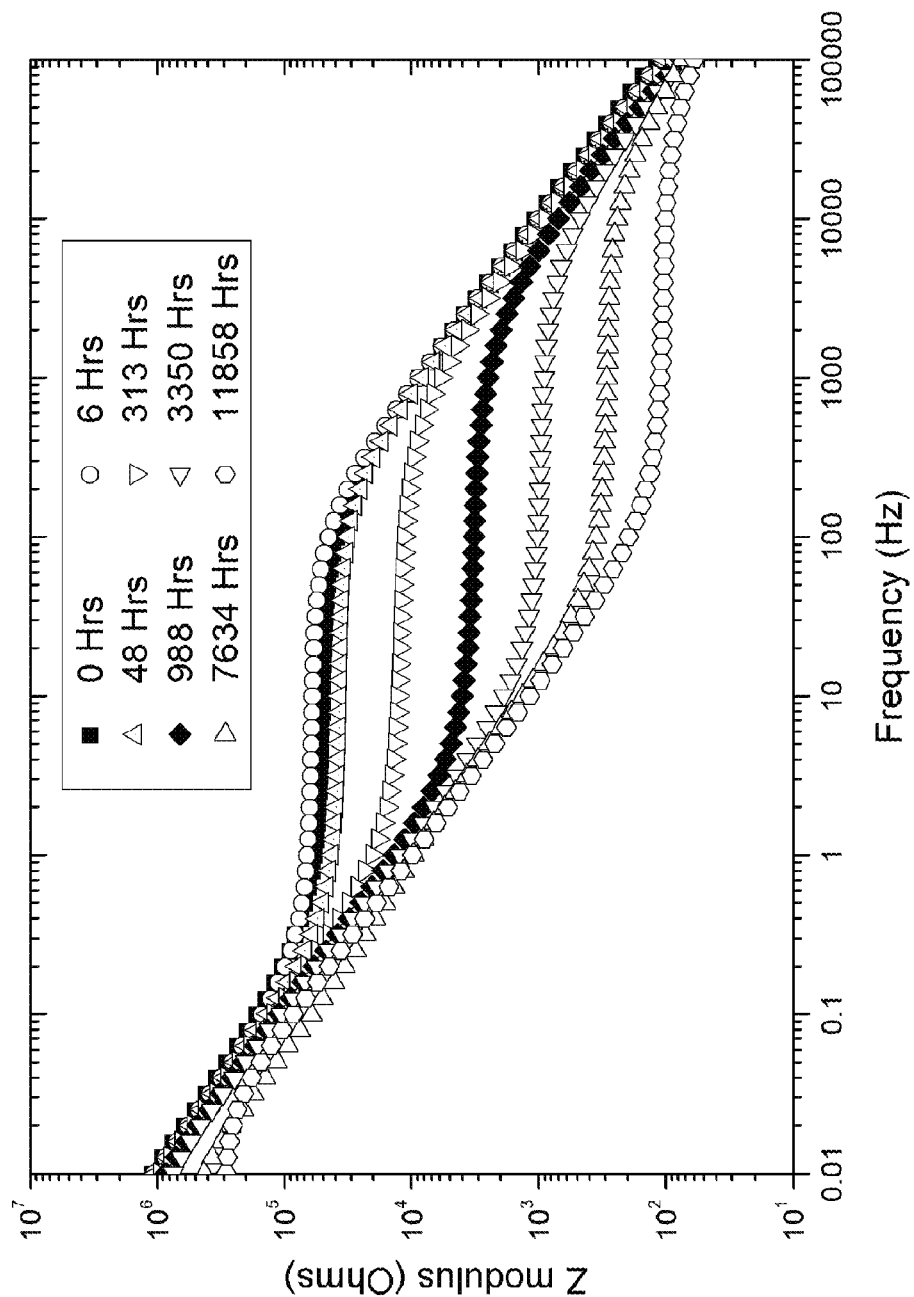
FIG. 6 is an Electrical Impedance Spectroscopy plot of p-PDA cross-linked coating on an aluminum alloy slide (Al2024-T3)

All samples, regardless of PDA isomer, show similar, interesting electrochemical impedance behaviour. FIG. 6 shows the bode plot of a representative sample of p-PDA cross-linked coatings on aluminum (Al2024-T3) at various time points. There are two important characteristics of these curves. First, the unique changes to the shape of the bode plot as a function of exposure and secondly the extended durability of the materials as demonstrated by the maintenance of high Z values (Zmod) at low frequency for up to 10000 hours. The changes to the shape of the bode plot are interesting in that during the earlier trials as shown in FIG. 6 at time points 0 hours and 6 hours where the impedance climbs initially at the high frequency end with a break-point occurring at a high frequency of approximately 100 Hz. At approximately 0.1 Hz the behaviour once again changes, this time from resistive to capacitive. During each subsequent trial (FIG. 6, time points 48 hours, 313 hours, 988 hours, 3350 hours, 7634 hours and 11858 hours), the impedance of the resistive region gradually declines and shifts to the right; however, the plots in the high and low frequency regions remain relatively unchanged. Only at long immersion times, greater than 3000 hours, very often longer than 5000 hours, does the impedance in the low frequency region begins to drop and show a change other than the reduction of the resistive flat region. Interestingly, the results shown here are very different from previously reported results where other sol-gel based coatings showed Randles cell type behaviour (Vreugdenhil A J, Gelling V J, Woods M E, Schmelz J R, Enderson B P. *Thin Solid Films*, 517 (2008) 538-43). While a similar behaviour had been observed previously in reports in the literature for membranes at various pH levels, the current results in the exemplary embodiment, appears to show a surprising response in sol-gel type coatings (X. Viatcheslav Freger and Sarit Bason, *J. Membrane Science*, 302 (2007) 1-9). Other works have shown spectra that demonstrate similar behaviour, sometimes for the first few hours, sometimes longer, but with coating systems that are quite different from the current exemplary embodiments. Furthermore, the aforementioned response has not been reported over the extended period of up to 5000 hours as surprisingly found here.

Figure 7:
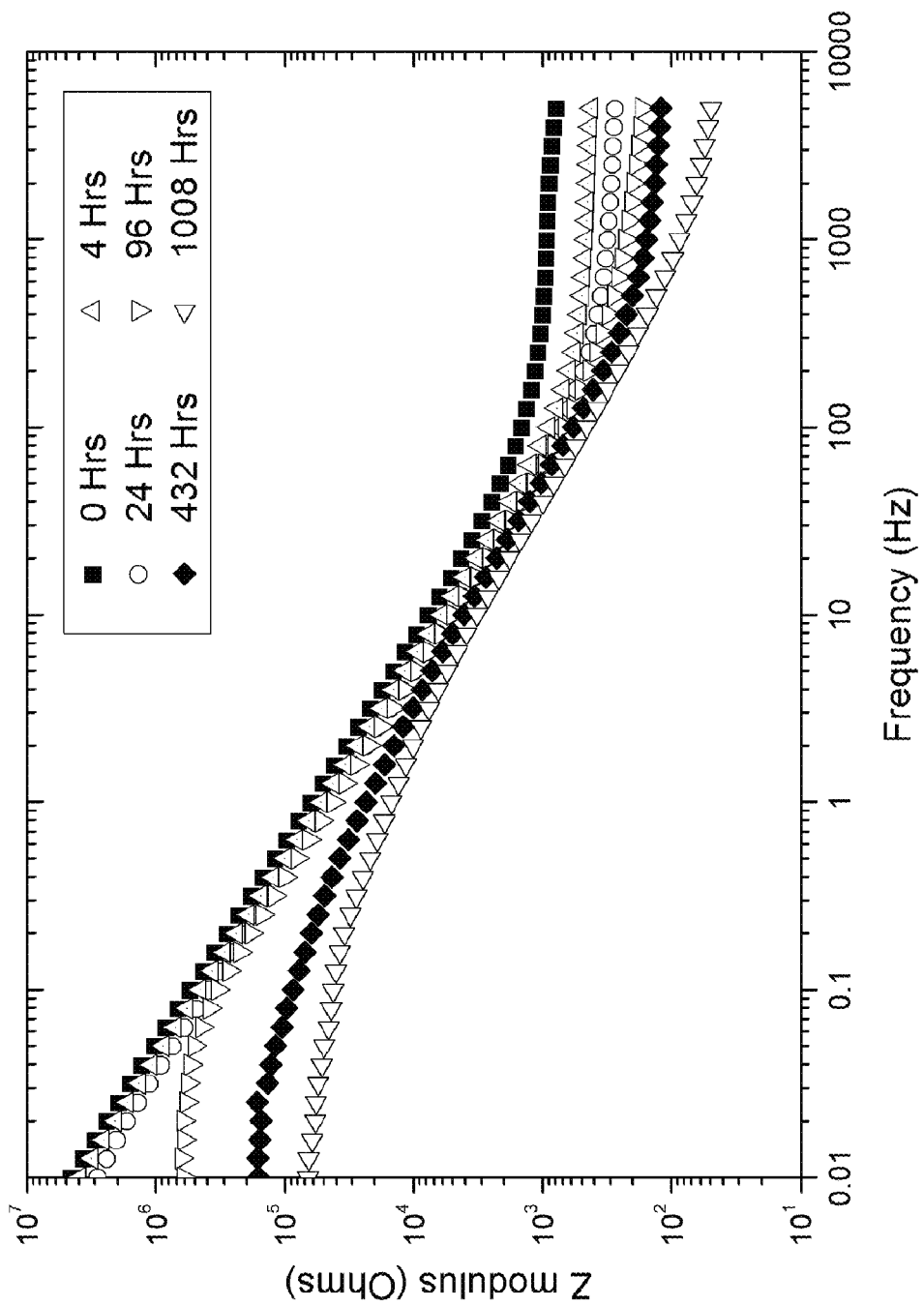
FIG. 7 is an Electrical Impedance Spectroscopy plot of an aliphatic cross-linked (ethylene diamine) coating on an aluminum alloy slide (Al2024-T3)

Secondly, the extended durability of currently described PDA crosslinked sol-gel coatings is significantly different from that observed for aliphatic crosslinked sol-gels and from most other corrosion suppression coatings. For example, performance data for ethylene diamine crosslinked sol-gels (FIG. 7) tend to show a steady decline in the low frequency response as a function of dilute Harrison's immersion time with no significant variation in the shape of the Electrical Impedance Spectroscopy (EIS) curve. In such cases, the typical time to failure was between 500 and 1000 hours (Vreugdenhil A J, Gelling V J, Woods M E, Schmelz J R, Enderson B P. *Thin Solid Films,* 517 (2008) 538-43) whereas the failure times for the current PDA crosslinked systems are an order of magnitude longer at 5000 to 10000 hours as shown in FIG. 6. For example, as a comparison to the aromatic diamine cross-linkers of FIG. 6, FIG. 7 shows an exemplary electrical impedance spectroscopy bode plot of an aluminum slide coated with an alkoxysilane and an epoxyalkoxysilane mixture and cross-linked with an aliphatic diamine curing agent (ethylene diamine cross-linker) at various exposure times to Harrison's Solution.

Aqueous Contact Angle Measurement

Contact angle measurements were performed by placing 2 μL drops of Millipore water on a 4 cm$^2$ area of coated glass substrate. This drop size is appropriately small to avoid deformation due to gravity and other interference. Digital images (not shown) were captured, and the equilibrium contact angles were measured directly from the image.

For example, Table 1 shows the aqueous contact angles obtained on aromatic crosslinked silica sol gels, coated onto glass substrates. These angles indicate that the coatings are not particularly hydrophobic. They are slightly lower than the contact angles reported for aliphatic crosslinked coatings (80-82°). As a comparison, Teflon and polyethylene, two common materials which do act primarily as hydrophobic barrier materials to corrosion, have contact angles of 103° and 93°, respectively (Williams, R. *J Phys Chem* 79 (1975) 1274-1276).

TABLE 1

Aqueous contact angle measurements of silica crosslinked sol gels on glass substrates.

| Cross-linking agent | o-PDA | m-PDA | p-PDA |
|---|---|---|---|
| Contact angle | 75.4° | 75.7° | 67.4° |
| Standard deviation | 2.4° | 1.8° | 3.6° |

Both o- and m-PDA crosslinked gels have identical contact angles, within the standard error, whereas p-PDA crosslinked gels exhibit more hydrophilic characteristics. There appears to be a correlation between the relative hydrophobicities of the coatings and their adhesion characteristics on glass in acidic solutions as p-PDA experienced the highest degree of delamination of the three cross-linking agents, whereas gels crosslinked with the other two isomers of PDA exhibited no significant delamination. However, the observed hydrophobicity does not appear to correlate with the most effective corrosion protection of Al2024-T3 in dilute Harrison's exposure testing. In this case, p-PDA crosslinked gels show the best corrosion resistance. These results demonstrate that the corrosion protection provided by the coatings is not primarily derived from hydrophobicity but suggests that instead the protection comes about by the chemical properties of the coating itself and in particular the PDA cross-linker. This is consistent with the unique behavior demonstrated by these materials in EIS analysis, dilute Harrison's exposure and adhesion testing.

Coloration

Some slight discolouration of the samples was observed in sol gels crosslinked with PDA isomers upon exposure to dilute Harrison's solution.

Example 4

Corrosion Protection on Steel

The ability of the aforementioned exemplary process and embodiments to prevent corrosion on steel alloys has also been examined. Low carbon steel alloy 1008/1012 (3×1 inches) was used. The steel slides were scrubbed with SCOTCH-BRITE® scouring pads and an alkaline degreaser in distilled water. The slides were then soaked in acetone for 2 minutes and then rinsed with Millipore grade water. They were then placed in a 25% HCl solution for 2 minutes followed by a further rinse with Millipore water. Slides were then blotted with KIMWIPES® industrial absorbent tissue and hung to air-dry.

Corrosion of the steel appeared more rapidly in dilute Harrison's solution compared aluminum alloys. However, relative to ethylene diamine (EDA) crosslinked sol-gels of the same formulation, the performance was three to nine times better based on visual inspection of samples in continuous dilute Harrison's solution immersion testing with PDA crosslinked systems lasting for more than 72 hours. Whereas EDA crosslinked gels lasted for 8-24 hours under the same conditions. Notably, the PDA crosslinked formulations were less effective at preventing corrosion in the scribe on steel tests compared to aluminum alloys. However, the steel substrate samples demonstrated good performance in preventing migration of corrosion beyond the scribe.

Figure 8A:
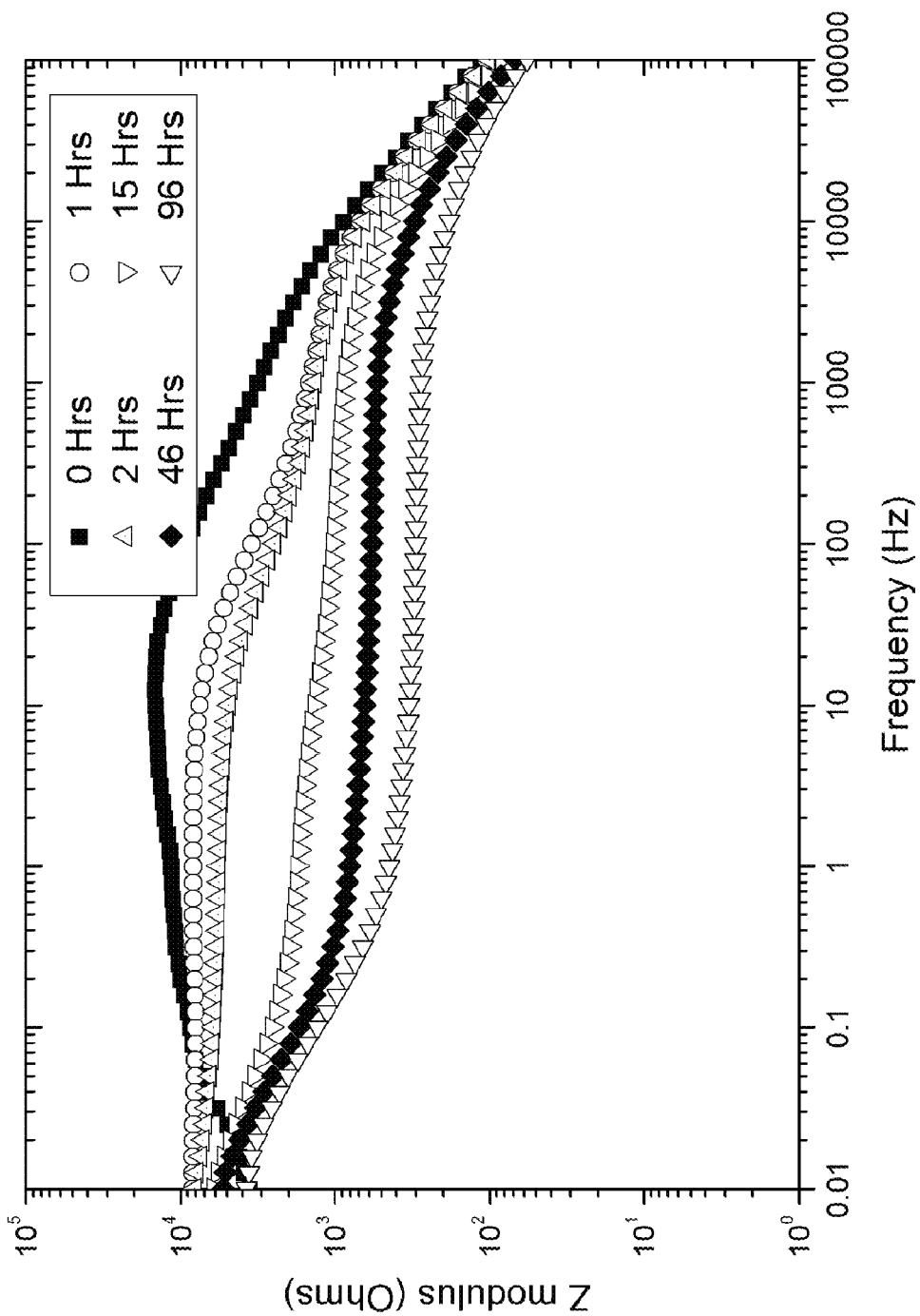
FIG. 8a is an Electrical Impedance Spectroscopy plot of p-PDA cross-linked coating on a steel slide at various time points following exposure to Harrison's solution.
Figure 8B:
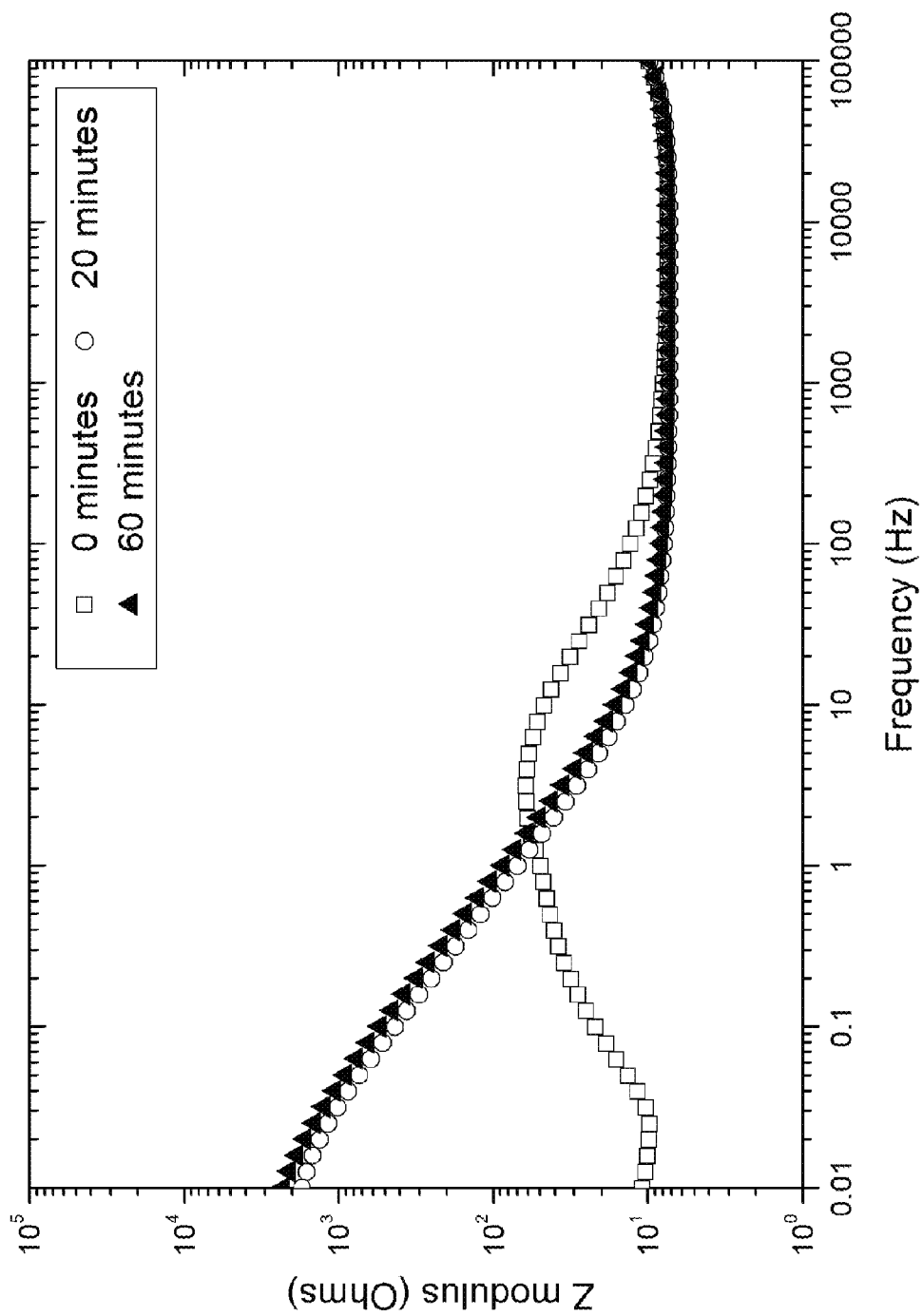
FIG. 8b is an Electrical Impedance Spectroscopy plot of bare steel slide at various time points following exposure to Harrison's solution.

Bode plots of EIS data acquired in evaluation of the samples on steel for p-PDA crosslinked formulations show that the samples maintained effective low frequency impedance values for 50 hours as shown in FIG. 8a, compared to bare steel under the same conditions where only the rapid build-up of corrosion products yields minimal low-frequency impedance as shown in FIG. 8b.

Example 5

Mixed PDA Cross-Linkers

Efficacy of the combination of the PDA cross-linker isomers in a single formulation was evaluated by visual examination of samples exposed to dilute Harrison's solution and by EIS on Al2024-T3 substrates in dilute Harrison's solution. In this example embodiment, equi-molar ratios of pairs of 1,2-PDA (o-PDA), 1,3-PDA (m-PDA) and 1,4-PDA (p-PDA) were dissolved and used at the appropriate stoichiometric ratio with epoxide groups in a silane formulation. For example, cross-linker combinations of o-PDA and m-PDA, o-PDA and p-PDA, m-PDA and p-PDA were tested.

Figure 9A:
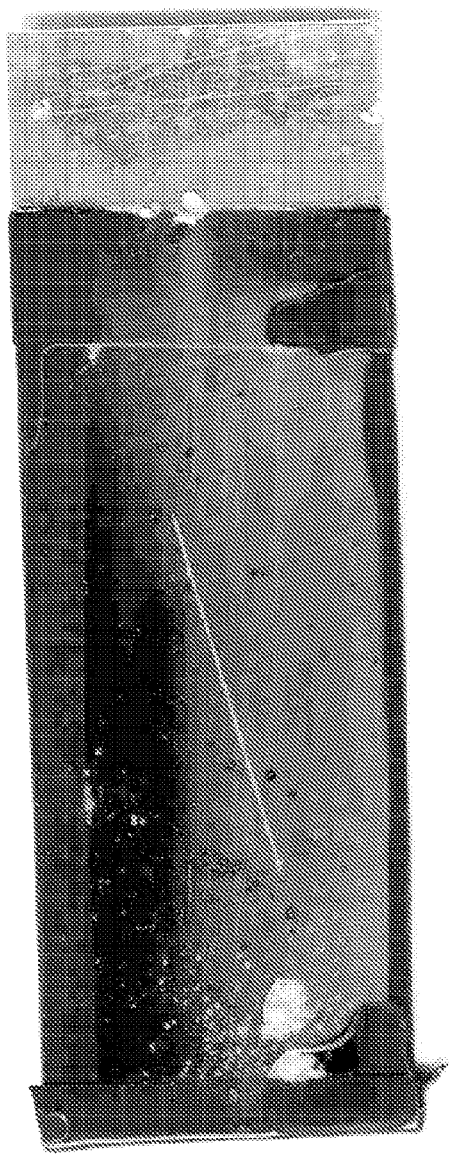
FIG. 9a is a picture of an aluminum alloy slide (Al2024-T3) coated with a mixture of an alkoxysilane and epoxyalkoxysilane and crosslinked with m/p-PDA following 8-months exposure to Harrison's Solution.
Figure 9B:
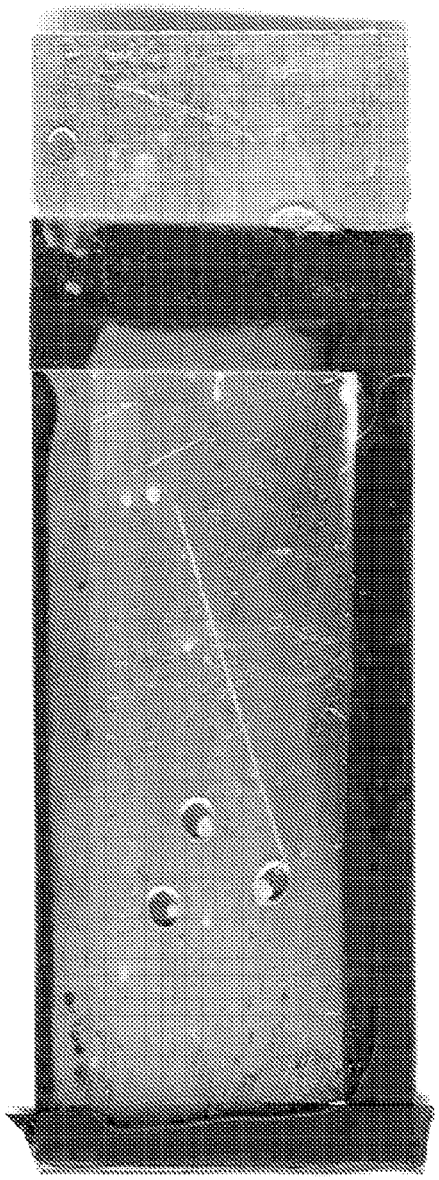
FIG. 9b is a picture of an aluminum alloy slide (Al2024-T3) coated with a mixture of an alkoxysilane and epoxyalkoxysilane and crosslinked with o/p-PDA following 8-months exposure to Harrison's Solution.

The resulting mixed-PDA crosslinked sol-gel coatings demonstrated performance visually representative of the best performing single isomer in the formulation, as noted above. All formulations demonstrated effective protection of the scribed regions where the coating had been intentionally removed down to bare metal. The m/p-PDA containing formulations demonstrated the most effective overall protection of the aluminum alloy substrate providing protection for up to nine months of continuous immersion in dilute Harrison's solution with no coating loss and appearance of only minor pinhole corrosion well away from the scribe. For example, FIG. 9a shows an m/p-PDA cross-linker containing formulation on an aluminum slide (Al2024-T3) after 8-months exposure to Harrison's Solution. As a comparison, for example, FIG. 9b shows an o/p-PDA cross-linker containing formulation on an aluminum slide (Al2024-T3) after 8-months exposure to Harrison's Solution.

The entire subject matter of all patents, published patent applications and non patent references referred to hereinabove are incorporated herein by reference.

Those of skill in the art will recognize certain modifications, permutations, additions and sub-combinations thereof of compounds and reagents noted herein. While a coating compositions and processes using epoxyalkoxysilanes and phenylenediamine cross-linking agents have been described for what are presently considered the exemplary embodiments, the disclosure is not so limited. To the contrary, the disclosure is intended to cover various modifications and equivalent combinations of compounds and reagents included within the spirit and scope of the appended claims. The scope of the following claims is to be accorded the broadest interpretation so as to encompass all such modifications and equivalent structures and functions.

What is claimed is:

1. A coating composition for application to a metal substrate for protection against corrosion, the composition comprising an aqueous dispersion of at least one water dispersible lower alkoxysilane carrying an epoxy group, and a water dispersible aromatic diamine reactive curing agent for coating onto a corrosion-susceptible substrate and curing in situ on the substrate to form a corrosion resistant protective coating thereon.

2. The coating composition of claim 1, wherein the aromatic diamine curing agent is a benzene diamine.

3. The coating composition of claim 2, wherein the benzene diamine is at least one phenylenediamine.

4. The coating composition of claim 3, wherein the phenylenediamine is ortho-phenylenediamine, meta-phenylenediamine or para-phenylenediamine.

5. The coating composition of claim 1, wherein the aromatic diamine curing agent is a mixture of at least two of ortho-phenylenediamine, meta-phenylenediamine and para-phenylenediamine.

6. The coating composition of claim 1, wherein the at least one lower alkoxysilane comprises a combination of an epoxy group carrying silane and a second lower alkoxysilane.

7. The coating composition of claim 1, wherein the lower alkoxysilane carrying an epoxy group is 3-glycidoxypropyltrimethoxysilane, 3-glycidyloxypropyltriethoxysilane, 3-glycidyloxypropyltrichlorosilane, diethoxy(3-(glycidyloxy)propyl)methylsilane, dichloro(3-(glycidyloxy)propyl)methylsilane, 6-glycidyloxyhexyltriethoxysilane, or 6-glycidyloxyhexyltrimethoxysilane.

8. The coating composition of claim 7, wherein the lower alkoxysilane carrying an epoxy group is 3-glycidyloxypropyl trimethoxysilane.

9. The coating composition of claim 6, wherein the second lower alkoxysilane is tetraethoxysilane, tetramethoxysilane, methyltrimethoxysilane, methyltriethoxysilane, phenyltrimethoxysilane, phenyltriethoxysilane, aminopropyltrimethoxysilane, aminopropyltriethoxysilane, methylaminopropyldimethoxysilane, methylaminopropyldiethoxysilane, dimethylaminopropylmethoxysilane or dimethylaminopropylethoxysilane.

10. The coating composition of claim 9, wherein the second lower alkoxysilane is tetraethoxysilane or tetramethoxysilane.

11. The coating composition of claim 1, wherein the metal substrate is steel.

12. The coating composition of claim 1, wherein the metal substrate is aluminum or alloys thereof.

13. A process of preparing a corrosion resistant protective coating on a corrosion susceptible substrate, which comprises forming an aqueous suspension of a lower alkoxysilane containing epoxy groups and an aromatic diamine reactive curing agent, applying said aqueous suspension to the substrate, and polymerizing and curing the lower alkoxysilane by sol-gel process to form a corrosion resistant protective coating on the substrate.

14. The process of claim 13, wherein the aromatic diamine curing agent is a benzene diamine.

15. The process of claim 14, wherein the benzene diamine is at least one phenylenediamine.

16. The process of claim 15, wherein the phenylenediamine is ortho-phenylenediamine, meta-phenylenediamine or para-phenylenediamine.

17. The process of claim 15, wherein the aromatic diamine curing agent is a mixture of at least two of ortho-phenylenediamine, meta-phenylenediamine and para-phenylenediamine.

18. The process of claim 13, wherein the alkoxysilane polymer of the coating is a combination of an epoxy group carrying silane and a second lower alkoxysilane.

19. The process of claim 13, wherein the lower alkoxysilane carrying an epoxy group is 3-glycidoxypropyltrimethoxysilane, 3-glycidyloxypropyltriethoxysilane, 3-glycidyloxypropyltrichlorosilane, diethoxy(3-(glycidyloxy)propyl)methylsilane, dichloro(3-(glycidyloxy)propyl)methylsilane, 6-glycidyloxyhexyltriethoxysilane, or 6-glycidyloxyhexyltrimethoxysilane.

20. The process of claim 13, wherein the lower alkoxysilane carrying an epoxy group is 3-glycidyloxypropyl trimethoxysilane.

21. The process of claim 18, wherein the second lower alkoxysilane is tetraethoxysilane, tetramethoxysilane, methyltrimethoxysilane, methyltriethoxysilane, phenyltrimethoxysilane, phenyltriethoxysilane, aminopropyltrimethoxysilane, aminopropyltriethoxysilane, methylaminopropyldimethoxysilane, methylaminopropyldiethoxysilane, dimethylaminopropylmethoxysilane or dimethylaminopropylethoxysilane.

22. The process of claim 18, wherein the second lower alkoxysilane is tetraethoxysilane or tetramethoxysilane.

23. The process of claim 13, wherein the corrosion susceptible substrate is steel.

24. The process of claim 13, wherein the corrosion susceptible substrate is aluminum or alloys thereof.

25. The process of claim 13, wherein the aqueous suspension of the lower alkoxysilane containing epoxy groups has a water to silane ratio of from about 10:1 to about 25:1.

26. The process of claim 13, wherein the aqueous suspension of the lower alkoxysilane containing epoxy groups has a water to silane ratio of about 15:1.

27. The process of claim 13, wherein the process is conducted at about room temperature.

28. A process of preparing a corrosion resistant protective coating on a corrosion susceptible substrate, which comprises applying to the corrosion susceptible substrate an aqueous suspension of a polymerized or polymerizable lower alkoxysilane containing epoxy groups, forming a coating on the corrosion susceptible substrate of said lower alkoxysilane and curing the polymer coating on the corrosion susceptible substrate by reaction with an aromatic diamine reactive curing agent.

29. The process of claim 28, wherein the aromatic diamine curing agent is a benzene diamine.

30. The process of claim 29, wherein the benzene diamine is at least one phenylenediamine.

31. The process of claim 29, wherein the phenylenediamine is ortho-phenylenediamine, meta-phenylenediamine or para-phenylenediamine.

32. The process of claim 28, wherein the aromatic diamine curing agent is a mixture of at least two of ortho-phenylenediamine, meta-phenylenediamine and para-phenylenediamine.

33. The process of claim 28, wherein the lower alkoxysilane carrying an epoxy group is 3-glycidoxypropyltrimethoxysilane, 3-glycidyloxypropyltriethoxysilane, 3-glycidyloxypropyltrichlorosilane, diethoxy(3-(glycidyloxy)propyl)methylsilane, dichloro(3-(glycidyloxy)propyl)methylsilane, 6-glycidyloxyhexyltriethoxysilane, or 6-glycidyloxyhexyltrimethoxysilane.

34. The process of claim 28, wherein the lower alkoxysilane carrying an epoxy group is 3-glycidyloxypropyl trimethoxysilane.

35. The process of claim 28, wherein the corrosion susceptible substrate is steel.

36. The process of claim 28 wherein the corrosion susceptible substrate is aluminum or alloys thereof.

37. The process of claim 28, wherein the aqueous suspension of the lower alkoxysilane containing epoxy groups has a water to silane ratio of from about 10:1 to about 25:1.

38. The process of claim 28, wherein the aqueous suspension of the lower alkoxysilane containing epoxy groups has a water to silane ratio of about 15:1.

39. The process of claim 28, wherein the process is conducted at about room temperature.

40. The process of claim 28, wherein the polymer curing reaction is conducted at about room temperature.

* * * * *